PATENTED JUL 25 1972

3,679,237

INVENTOR.
WILLIAM M. DE ANGELIS

BY Stephen E. Rockwell

ATTORNEY.

United States Patent
De Angelis

[15] 3,679,237
[45] July 25, 1972

[54] COUPLING FOR JOINING GLASS PIPE SECTIONS AND THE LIKE

[72] Inventor: William M. De Angelis, Wilton, Conn.

[73] Assignee: Technicon Instruments Corporation, Tarrytown, N.Y.

[22] Filed: June 23, 1970

[21] Appl. No.: 48,971

[52] U.S. Cl............................285/109, 285/353, 285/371, 285/387, 285/DIG. 12
[51] Int. Cl....................................F16l 17/06, F16l 49/00
[58] Field of Search..................285/109, 370, DIG. 12, 353, 285/387, 364, 371

[56] References Cited

UNITED STATES PATENTS

| | | | |
|---|---|---|---|
| 3,428,337 | 2/1969 | Read | 285/387 X |
| 3,276,792 | 10/1966 | Dunton | 285/109 |
| 2,207,518 | 7/1940 | Moser | 285/109 |
| 3,372,949 | 3/1968 | McLay | 285/364 |
| 2,691,536 | 10/1954 | Tamminga | 285/370 X |
| 1,529,525 | 3/1925 | Winter | 285/370 X |

FOREIGN PATENTS OR APPLICATIONS

| | | | |
|---|---|---|---|
| 309,288 | 11/1955 | Switzerland | 285/DIG. 12 |
| 267,697 | 3/1927 | Great Britain | 285/109 |
| 1,522,834 | 3/1968 | France | 285/353 |
| 1,174,948 | 12/1969 | Great Britain | 285/353 |

*Primary Examiner*—Thomas F. Callaghan
*Attorney*—S. E. Rockwell and S. P. Tedesco

[57] ABSTRACT

The juxtaposed ends of two glass pipe sections are joined by a coupling construction which comprises an inner coupling sleeve having its ends frictionally mounted in coupling chambers formed in cylindrical enlargements (end bells) provided at each of the juxtaposed ends to thereby effect radial fluid seals in the enlargements. An O-ring is disposed in an annular groove formed in the outer surface of the sleeve in the space between the juxtaposed ends to form fluid seals thereat. Threadedly telescoped external coupling rings are mounted over external portions of the enlargements to draw the latter toward each other to effect pressure between the enlargements and the O-ring to maintain the aforementioned fluid seals.

4 Claims, 7 Drawing Figures

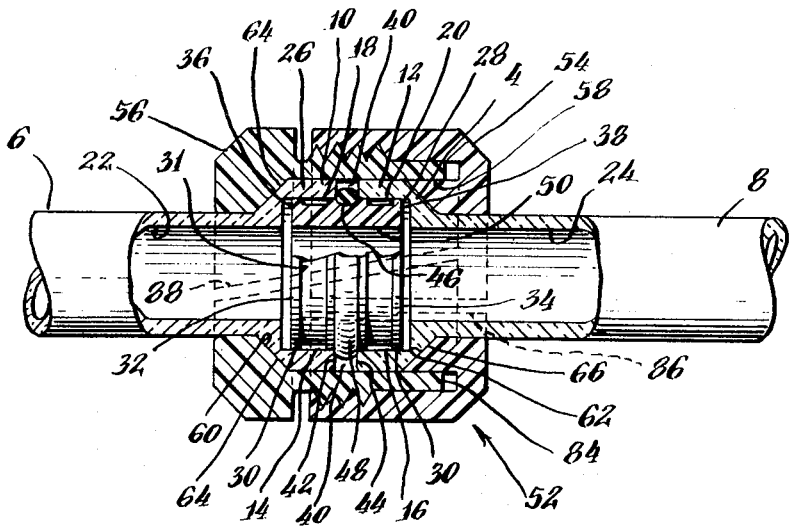

COUPLING FOR JOINING GLASS PIPE SECTIONS AND THE LIKE

BACKGROUND OF THE INVENTION

1. Field of the Invention.

The present invention relates to an improvement in a coupling or joint for joining the juxtaposed ends of two pipes or tubular sections of glass in fluid-tight manner. Such a coupling or joint must be capable of withstanding, without leakage, fluid pressure applied thereto from within the pipe and yet must be flexible or resilient enough to be able to withstand slight misalignment of the pipe or tubular sections without detracting from its fluid seal.

2. Prior Art.

Known in the art is a joint which consists of inner and outer glass pipe or tubular members which are ground together until a seal is made. In order to add to the sealing ability of the joint, a sealing lubricant is applied to the sealing surfaces to facilitate formation of an air-tight seal. However, this type of joint is difficult to make function properly, and has the disadvantage that the quality of the seal differs with the skill of the manufacturer. Furthermore, in case of breakage of one of the tubular members, it has to be replaced and, often times, the new part does not effectively match the other of the tubular members in fluid-tight relation.

Also known, is the glass ball joint which serves to join two pipe or tubular sections and which allows some misalignment, but still requires ground surfaces and some sort of lubricant.

A known glass joint which serves to join the juxtaposed ends of two pieces of glass pipe comprises an enlarged coupling bell at and integral with each pipe end and a coupling means therefor. Each of the coupling bells has a glazed cylindrical coupling chamber therein which has a diameter substantially greater than the bore of the pipe and has its inner end terminating at a transverse annular shoulder between the coupling chamber and the bore of the pipe, the wall thickness of each coupling bell being at least as great as the wall thickness of the glass pipe. A slightly flexible, thin-walled coupling sleeve, of a fluorocarbon resin or equal, of a length greater than the combined lengths of the two coupling chambers and of an outer diameter greater than the inner diameter of the coupling chambers, is sealably telescoped into the latter with an interference fit. The coupling sleeve supports two O-rings in external grooves, one disposed within each of the coupling chambers to enhance or replace the fluid seals between the coupling sleeve and the coupling chambers. Thus arranged, the free ends of the coupling bells are spaced from each other and exterior clamping means are provided to urge the coupling bells towards each other. Such an arrangement is disclosed in U.S. Pat. No. 3,372,949 issued on Mar. 12, 1968.

Although somewhat flexible, the last mentioned type of glass joint has the disadvantage that its sealing area is exclusively restricted to the interior sealing surfaces of the joint, that is, not between the end bells, which is disadvantageous in that the seal between the coupling sleeve and the coupling bells may be damaged or impaired and cause leakage. Furthermore, an area of the porous fluorocarbon resin coupling sleeve is exposed intermediate the free ends of the coupling bells, which is disadvantageous and unsatisfactory for relatively high vacuum applications.

SUMMARY OF THE INVENTION

It is an object of the present invention to overcome the above disadvantages encountered with conventional couplings or joints for glass pipes and the like, and to provide an improved coupling for joining the juxtaposed ends of two pipe or tubular sections of glass, which is simple as regards its construction, economical as regards its maintenance and fully effective as regards its sealing capability.

Such a coupling according to the present invention comprises a pair of glass pipe sections each having an enlarged end bell defining an integral substantially cylindrical coupling chamber at each of the two juxtaposed glass pipe ends to be coupled, each of the two coupling chambers having a free end facing the free end of the other and having an inner generally cylindrical surface with a diameter substantially larger than the inner diameter of the pipe sections. An annular, slightly deformable, though form-retaining coupling sleeve, preferably made of a fluorocarbon resin, has its ends inserted into the coupling chambers to interconnect the latter. The coupling sleeve has along at least a part of its length an outer peripheral diameter greater than the diameter of the inner cylindrical surfaces of the chambers to form a radical annular fluid seal therewith when operatively assembled.

The coupling sleeve has a central peripheral ring-receiving groove. An elastomer O-ring is snugly operatively mounted in the ring-receiving groove of the coupling sleeve and has a relaxed inner diameter less than the diameter of the groove in coupling sleeve. Clamping means in the form of an outer adjustable annular coupling collar is detachably mounted over the end bells forming the two coupling chambers to draw the latter in a direction towards each other against the O-ring to effect and maintain the aforementioned fluid seals and provide a seal for the porous coupling sleeve for relatively high vacuum applications.

Other objects of the present invention will appear from the following description and the accompanying drawings.

DESCRIPTION OF THE PREFERRED EMBODIMENTS

Figure 6:
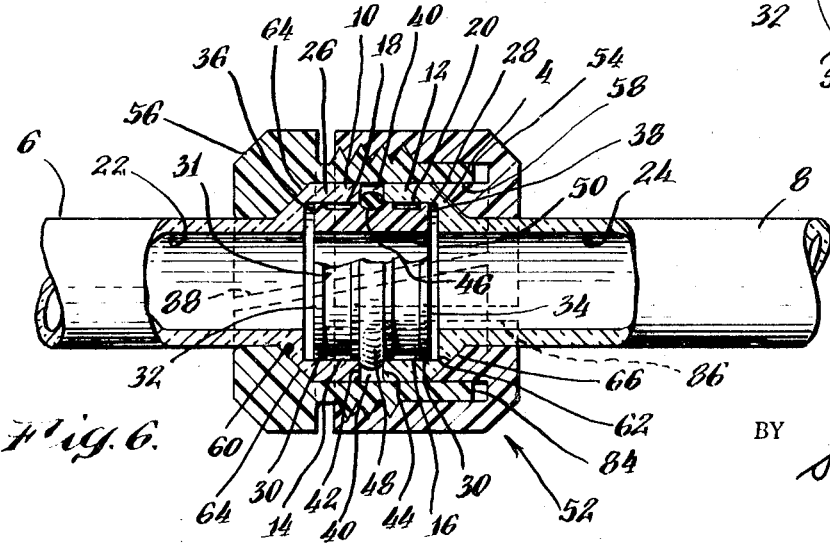
FIG. 6 is a longitudinal cross-sectional view of the embodiment of FIG. 1.

Referring now to the drawing in which like reference numerals refer to like parts and with attention initially directed to FIG. 6, there is shown the juxtaposed ends 2, 4 of two pipe sections 6 and 8, made of glass, the type used in laboratory or chemical apparatus to carry fluids or for vacuum applications. Integrally formed at each of the juxtaposed ends, 2, 4 is an end bell in the form of a substantially cylindrical, flange-like enlargement 10, 12 defining a generally cylindrical inner recess or coupling chamber 14 and 16. The diameter of the inner cylindrical surfaces 18, 20 of the chambers 14, 16 is substantially larger than the inner diameter of the bores 22, 24 of the pipe sections 6 and 8. Formed at the transition between the inner cylindrical surfaces 18, 20 of the chambers 14, 16, and the bores 22, 24 are transverse annular shoulders 26, 28 in the embodiment illustrated by way of example. The surfaces 18, 20 are polished or glazed so as to effect a fluid seal when a suitable member is pressed against them.

An annular inner coupling sleeve 30, is axially received with its end portions 32, 34 frictionally mounted in the chambers 14 and 16 and sealing against the axial surfaces 18, 20 thereof, both ends of the sleeve having clearance with the transverse annular shoulders 26, 28 which exist in the bells only for convenience in structuring the bells.

Coupling sleeve 30 is structured of a generally form-retaining, though slightly deformable, plastic or synthetic resin having a capacity for recovering its form after a deformation force is removed. It is chemically inert in respect to most liquids and gases, will withstand relatively high temperatures without deterioration, and forms a non-adhering, non-seizing or non-freezing fluid-tight contact with a glazed or polished surface when pressed against it. One example of such a material is a fluorocarbon resin commercially available under the trademark Teflon. As indicated, the outer peripheral surface of the coupling sleeve 30 is, at least in part, greater than the inner diameter of the surfaces 18, 20 of the chambers 14, 16. As illustrated a pair of annular relief grooves 31 are formed in it. The relief grooves 31 enhance flexibility of the sleeve 30.

A central peripheral annular ring-receiving groove 46 is provided in the outer surface of the sleeve 30 and is operatively disposed intermediate the spaced free bell ends 42, 44.

Disposed in the groove 46 and laterally abutting the free bell ends 42, 44 in a space 40 therebetween is an elastomer O-ring 48 which is made of a material that is more resilient than that of the coupling sleeve 30. The O-ring significantly enhances the sealing capacity of the coupling by effecting a seal between the O-ring and each of the juxtaposed free ends of the bells, when the joint is operatively assembled. Importantly, this O-ring completely seals off all portions of the coupling sleeve, which is porous, from the atmosphere. As shown, the inner diameter 50 of the coupling sleeve 30 is substantially the same as the inner diameter of the bores 22, 24 of the pipe sections 6 and 8.

Clamping means in the form of an adjustable clamping collar 52 is mounted on the exterior of, and surrounds the exterior portions of, the end bells which form the generally cylindrical chambers 14 and 16, as shown in FIG. 6. Clamping collar 52 comprises a first annular coupling ring 54 and a second annular coupling ring 56 threadedly telescoped together. The coupling rings are made of deformable, resilient plastic material and together define an axial central bore 58 therethrough which has in part a diameter substantially the same as the outer diameter of the end bells 10, 12 so as to fit thereover without undue play. The coupling collar includes axially opposite end portions 60, 62 inclined to a diameter smaller than the diameter of the inner cylindrical surfaces of the chambers but greater than the outer diameter of the pipe sections. The coupling bells together define oppositely facing inclined outer rear shoulders 64, 66 and the inclined end portions 60, 62 of the coupling collar are arranged to firmly abut the inclined rear shoulders to clamp the end bells together to operatively effect the internal joint formed by the coupling sleeve 30.

Figure 1:
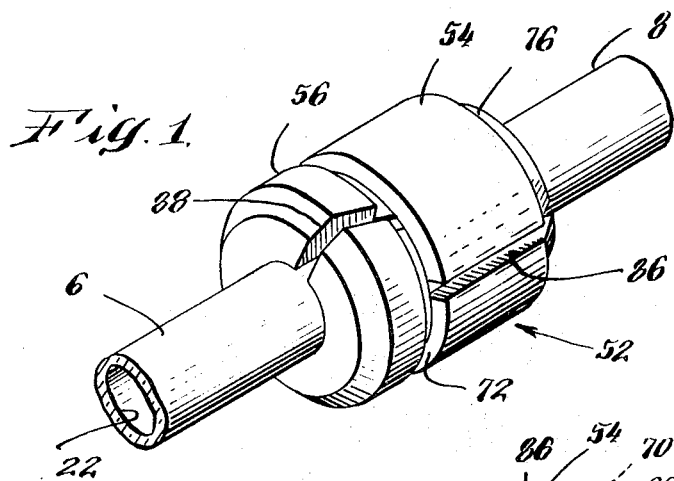
FIG. 1 is a perspective view of a coupling incorporating a preferred embodiment of the present invention.
Figure 2:
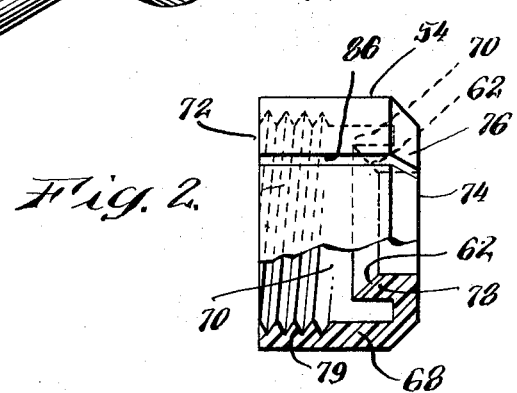
FIG. 2 is a side elevational view of one of the coupling collars of the clamping means incorporated in the embodiment of FIG. 1.
Figure 3:
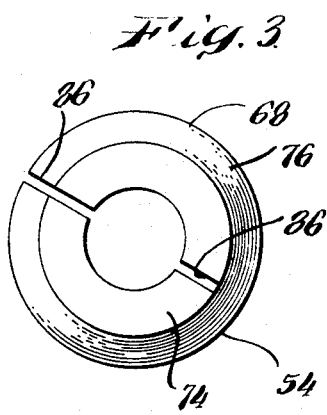
FIG. 3 is a top plan view of the coupling collar of FIG. 2.

As shown in FIGS. 2 and 3, the first coupling ring 54 comprises an outer cylindrical wall 68 defining an inner substantially cylindrical chamber 70, and having axially opposite ends 72, 74 and a transverse annular shoulder 76 extending radially inwardly and bounding a central opening in the end 74. The transverse shoulder 76 supports an annular wall portion 78 axially inwardly directed from the central opening in substantial parallelism with, but inwardly spaced from, the cylindrical outer wall 68. A thread 79 is formed over a portion of the inner surface of wall 68.

Figure 4:
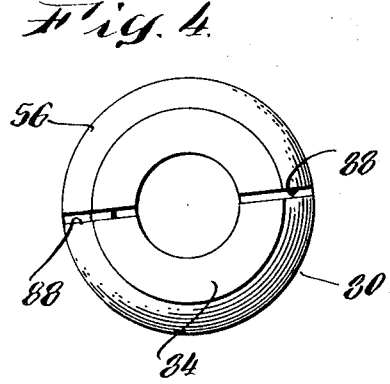
FIG. 4 is a top plan view of the other coupling collar incorporated in the embodiment of FIG. 1.
Figure 5:
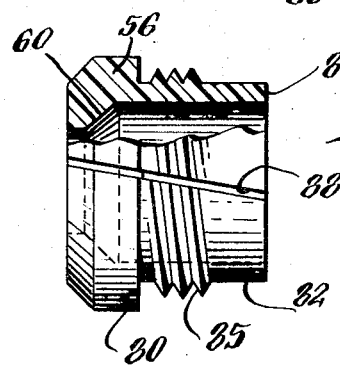
FIG. 5 is a side elevational view of the coupling collar of FIG. 4.
Figure 7:
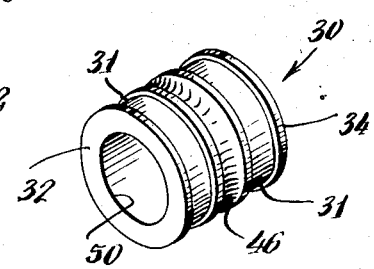
FIG. 7 is a perspective view of the coupling sleeve.

The second coupling ring 56, as shown in FIGS. 4 and 5, is generally cylindrical and comprises an annular base portion 80 and an axial annular stub portion 82 projected therefrom to a free end 84 and provided with an outer thread 85 formed over a portion of its peripheral surface and arranged to be threadedly intermeshed with the thread 79 of the first coupling ring 54. When so assembled, the end 84 of the stub portion 82 is disposed intermediate the cylindrical walls 68 and 78 of the first coupling ring 54.

The coupling rings 54, 56 each include an axial split 86, 88 completely through the side-wall structure thereof to render the rings non-continuous. One of the splits extends at an inclined angle relative to the other split. The splits 86, 88 may be inclined relative to each other and to the axes of symmetry of the coupling chambers 54 and 56 as well, the inclination being in opposite directions. The splits 86, 88 permit the clamping collar 54 to be mounted on and dismounted from glass tubing at the juxtaposed glass pipe ends by forcing the rings 54, 56 radially onto, or off of, the glass tubing individually, and then coupling them over the internal joint formed by the end bells 10, 12 and the coupling sleeve 30.

This operation eliminates the need to axially slide the coupling rings onto an end of, and then over, the glass tubing, as would be necessary if the coupling rings were not split. This could be a very difficult task if long lengths of glass tubing or intricate glass apparatus are involved. The non-alignable Splits insure against a possibly weak clamping collar.

In an alternative form not necessitating illustration, the inner surfaces 18 and 20 of the bells may be tapered, the taper being in a direction toward the respective pipe sections so that the chambers 14 and 16 narrow toward the last-mentioned sections. In this form neither chamber has a transverse annular shoulder, and the coupling sleeve 30 has a complemental taper at least at its end portions which reduces the thickness of the sleeve in these areas tending to make them more flexible. Also in this form, pockets are omitted in the assembly between the ends of the sleeve and the inner ends of the chambers.

It is believed the many advantages of this invention will now be apparent to those skilled in the art. The foregoing description is illustrative, rather than limiting, as a number of variations and modifications may be made without departing from the true spirit and scope of the invention. The invention is limited only by the scope of the following claims.

What is claimed is:

1. A coupling for joining the juxtaposed ends of two glass pipe sections or the like, said coupling comprising: a pair of glass pipe sections, each having at its free end an enlarged coupling bell, said end bells being spaced and juxtaposed; an integral axially extending coupling chamber formed in each of the end bells; each of the two coupling chambers having an open end facing an open end of the other and spaced therefrom, and an inner axial surface with a diameter larger, at least in part, than the inner diameter of the pipe sections; an annular deformable coupling sleeve of plastic material having form-retaining characteristics, with end portions disposed in said coupling chambers to interconnect the latter, said coupling sleeve having at least in part an outer peripheral diameter greater than the diameter of said inner axial surfaces of said coupling chambers to form radial fluid seals therewith, and having a peripheral ring-receiving groove intermediate the spaced free ends of said bells; and an elastomer O-ring snugly operatively mounted in said ring-receiving groove in abutting relation with said spaced free bell ends to form axial seals therewith; and clamping means operatively mounted on the exterior of said end bells to draw the latter toward each other to effect axial pressure between the end bells and said O-ring to effect and maintain said aforementioned seals, said clamping means comprising a first annular coupling ring and a second annular coupling ring threadedly telescoped into said first coupling ring, said first and said second coupling rings together defining an axial central bore therethrough having a diameter in part larger than the outer diameter of said end bells so as to fit thereover and including axially opposite end portions inclined to a diameter smaller than the diameter of said inner axial surfaces of said chambers but greater than the outer diameter of said pipe sections, said end bells together defining oppositely facing inclined outer rear shoulders, and said inclined end portions of the coupling rings firmly abutting respectively said inclined rear shoulders of the bells, rings being structured of deformable plastic material and each including an axial split completely through the side-wall structure thereof to facilitate the radial mounting of said coupling rings on said pipe sections, the split in one of said coupling rings extending axially along the axes of symmetry of said coupling rings, and the split in the other of said coupling rings extending at an inclination relative to the axes of symmetry of said coupling rings.

2. A coupling as described in claim 1, wherein the splits in said coupling rings are each inclined with reference to the axis of symmetry of the other of said coupling rings, and inclined in opposite directions.

3. A coupling for joining the opposing end portions of two non-metallic pipe sections which end portions are respectively provided with radial flanges comprising: means defining an enlarged axial chamber in each pipe section opening through said end thereof and having an axial inner surface, a deformable coupling sleeve of plastic material having form-retaining characteristics, with end portions disposed in said chambers to interconnect the latter, said coupling sleeve having at least in part an outer diameter greater than the diameter of said axial surfaces of the chambers to form radial fluid seals therewith, a resilient O-ring surrounding the sleeve in abutting relation to said ends of the pipe sections, to form a seal therewith, and clamping means mounted on said flanges of the pipe sections and interconnecting the latter to draw them toward each other to effect axial pressure between said ends of the pipe sections and said O-ring to effect and maintain said aforementioned seals, said clamping means comprising a first annular coupling ring and a second annular coupling ring threadedly telescoped into said first coupling ring, said first and second coupling rings being made of a deformable plastic material, together defining an axially central bore therethrough having a diameter in part larger than the outer diameter of said pipe flanges so as to fit thereover, and including axially opposite end portions extending radially inwardly beyond the outer diameter of said pipe flanges to provide shoulders engageable with the axially rear surfaces of said flanges to exert pressure thereon in an axial direction, said coupling rings each including an axial split completely through the side-wall structure thereof to facilitate the radial mounting of said coupling rings on said pipe sections, said splits in the coupling rings being in a relationship to cross one another at an angle and thereby prevent alignment of the splits.

4. A coupling for joining the opposing end portions of two non-metallic pipe sections which end portions are respectively provided with radial flanges comprising: sealing means including a member of annular cross section inserted in said opposing end portions of pipe sections and extending therebetween, said sealing means further including a resilient element supported by and encircling said member in abutting relation to said ends of the pipe sections to form a seal therewith, and clamping means mounted on said flanges of the pipe sections and interconnecting the latter to draw them toward each other to effect axial pressure between said ends of the pipe sections and said element of said sealing means, said clamping means comprising a first annular coupling ring and a second annular coupling ring threadedly telescoped into said first coupling ring, said first and second coupling rings defining an axially central bore therethrough having a diameter in part larger than the outer diameter of said pipe flanges so as to fit thereover, and including axially opposite end portions extending radially inwardly beyond the outer diameter of said pipe flanges to provide shoulders engageable with the axially rear surfaces of said flanges to exert pressure thereon in an axial direction, said coupling rings each including an axial split completely through the side-wall structure thereof to facilitate the radial mounting of said coupling rings on said pipe sections, said splits in the coupling rings being angularly inclined with reference to one another to thereby prevent alignment of said splits.

* * * * *